Oct. 31, 1950     T. B. CHACE     2,528,422
FLUID MIXING CONTROL SYSTEM
Filed Nov. 13, 1945     3 Sheets-Sheet 1

Inventor
THOMAS B. CHACE

Oct. 31, 1950 T. B. CHACE 2,528,422
FLUID MIXING CONTROL SYSTEM
Filed Nov. 13, 1945 3 Sheets-Sheet 2

Inventor
Thomas B. Chace

Oct. 31, 1950 — T. B. CHACE — 2,528,422
FLUID MIXING CONTROL SYSTEM
Filed Nov. 13, 1945 — 3 Sheets-Sheet 3

Inventor
THOMAS B. CHACE.

Patented Oct. 31, 1950

2,528,422

UNITED STATES PATENT OFFICE 2,528,422

FLUID MIXING CONTROL SYSTEM

Thomas B. Chace, Winnetka, Ill., assignor to The Dole Valve Company, Chicago, Ill., a corporation of Illinois Application November 13, 1945, Serial No. 627,982

5 Claims. (Cl. 236—12)

1

This invention relates to a fluid control system, and more particularly to a system which is particularly applicable to non-automatic or semi-automatic washing machines.

On non-automatic or semi-automatic domestic washing machines of the type which do not have mechanisms for starting and stopping the machine, filling the tub and emptying the water, and centrifugally drying the clothes, the problem of securing properly temperatured water to the correct level in the tub is a difficult one. The most common practice, at the present time, is to have an inlet hose connected from the faucet to the tub to adjust the temperature by proportioning the opening of the hot and cold water faucets by hand and waiting until the tub is filled and then closing the faucets.

During the fill period any temperature changes in the hot or cold water supply lines, or more particularly, pressure changes creating a different relative pressure differential, will, of course, change the mixed water temperature. Of equal importance and considerable inconvenience is the time factor in waiting for the tub to fill, particularly in low pressure areas. The operator does not usually leave the machine during the fill period because of fear of overflowing.

One of the principal features and objects of the present invention is to provide an arrangement which includes an automatic temperature controlled mixer valve with hand opening diaphragm fill valves and fluid level responsive member shutoff valves for semi-automatic operation of the washing machine.

It is a further object of the present invention to provide a novel fluid control system which is semi-automatic in operation, which is efficient in operation and which is rugged and reliable in use.

Another object of the present invention is to provide a novel fluid control system for laundry machines.

Still another object of the present invention is to provide a novel fluid control system employing a single automatic temperature controlled mixer valve having hot and cold water bypaths which cooperate with diaphragm shutoff valves and associated fluid level responsive members for delivering a predetermined quantity of water to a laundry machine at a predetermined desired temperature.

Still another and further object of the present invention is to provide a novel pilot-operated valve and fluid level responsive actuation mechanism.

The novel features which I believe to be characteristic of my invention are set forth with particularity in the appended claims. My invention itself, however, as to its organization, method of operation and manner of construction, together with further objects and advantages thereof, may best be understood by reference to the accompanying drawings, in which:

Figure 4 is an isometric view of the outer shell of a household washing machine equipped with the manually operated mechanism shown in Figure 1.

Figure 1:
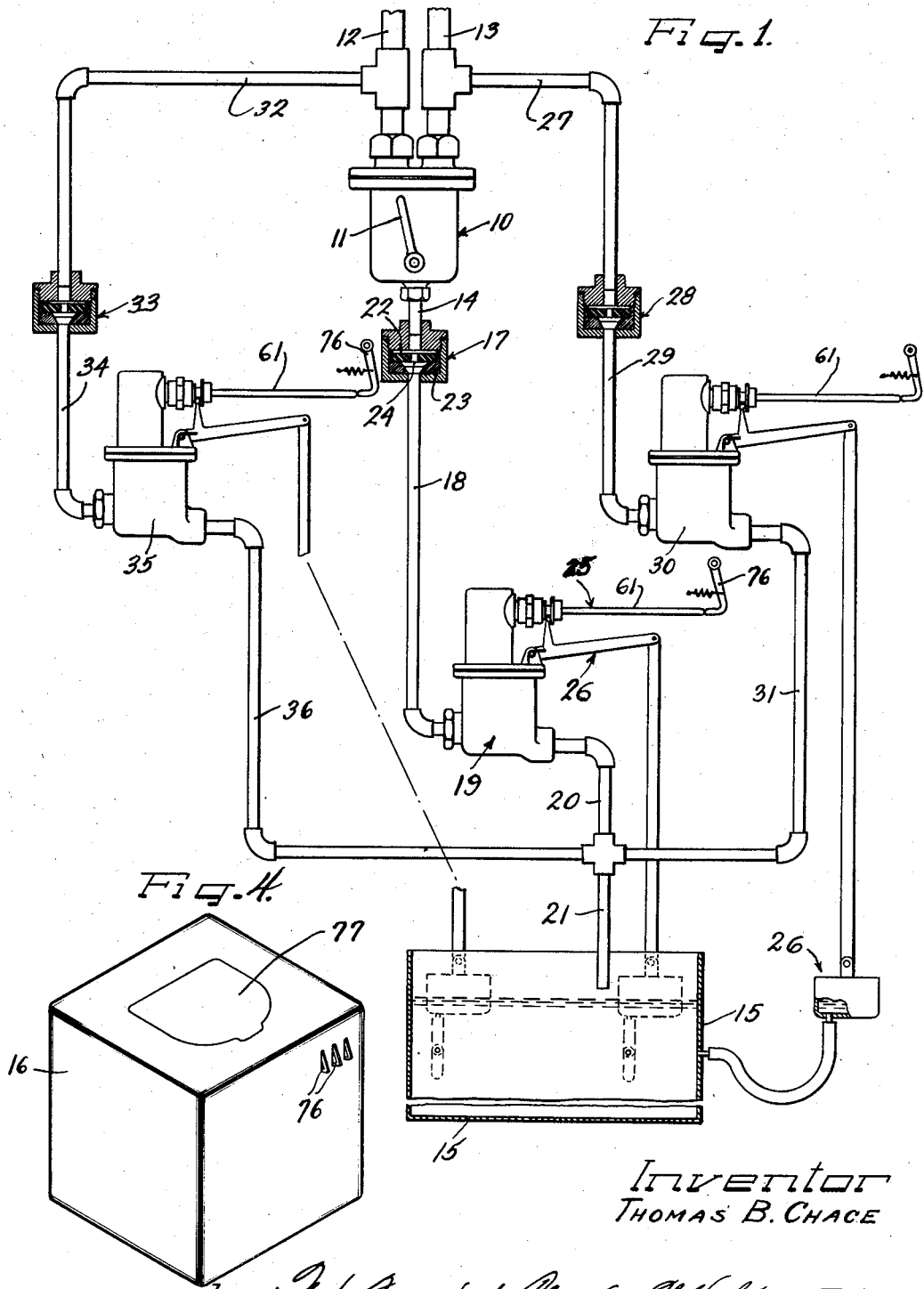
Figure 1 is a diagrammatic illustration of a fluid control system embodying the novel teachings of the present invention.

The fluid control system diagrammatically illustrated in Figure 1 of the drawings includes an automatic temperature controlled mixer valve 10. This automatic temperature controlled mixer valve 10 may be of any conventional design having hot and cold fluid inlets, and means for proportioning the fluid from the inlet to maintain a constant predetermined temperature in the fluid delivered therefrom. Any suitable and conventional temperature responsive means is included in the mixer valve for controlling and proportioning the hot and cold fluid inlet. By way of example and not by way of limitation, this automatic temperature controlled mixer valve may be of the general design shown in the Lund Patent No. 2,310,975, granted February 16, 1943. The diagrammatic illustration of the handle 11 on the valve mechanism 10 shown in Figure 1 indicates the means provided for adjusting the temperature setting to which the mixer valve will deliver fluid.

The automatic temperature controlled mixer valve 10 is connected to a hot fluid inlet duct 12 and to a cold fluid inlet duct 13. The outlet of the valve 10 which is arranged to deliver fluid at a predetermined temperature as selected by the positioning of the lever 11, is indicated at 14.

The tub of the washing machine to which the fluid is to be delivered is indicated diagrammatically at 15. This may be housed within the washing machine 16 which is illustrated in Figure 4 of the drawings.

The outlet pipe 14 of the automatic temperature controlled mixer valve 10 is connected to an automatic constant rate of flow maintaining device 17 which in turn is connected through a delivery pipe 18 and a shutoff valve 19 to the delivery pipes 20 and 21. The automatic constant rate of flow maintaining device 17 may be of any suitable design, but has been illustrated as being of the design described and claimed in the copending application of Leslie A. Kempton, U. S. Serial No. 545,312, filed July 17, 1944, now Patent No. 2,454,929, dated November 30, 1948, and assigned to the same assignee as the present invention. In substance, this constant rate of flow maintaining device includes a resilient diaphragm member 22 seated on a shoulder member 23 and having a central orifice 24 which is smaller than the opening provided by the shoulder member 23. As the pressure of the fluid against the upper side of the resilient member 22 increases, the washer is deflected downwardly causing a smaller and smaller restriction in the upper end of the orifice 24. It has been found in practice that a construction of the type diagrammatically illustrated herein will maintain a substantially constant rate of fluid flow in the outlet irrespective of very wide variations in fluid pressure (such, for example, as variations from 15 pounds per square inch to 150 pounds per square inch).

The shutoff valve 19 includes manually operable mechanism 25 for opening the valve and fluid level responsive member operated mechanism 26 for shutting the valve to interrupt the flow of fluid from the pipe 18 to the delivery pipes 20 and 21. Before going into a detailed description of the valve 19 and its associated operating mechanism, reference will be made to the fact that a cold water bypass fluid system is provided, as well as a hot water bypass. More particularly, a cold water bypass is provided from a pipe 27 which connects with the cold water supply 13. This pipe 27 connects with a constant rate of flow maintaining device 28 which in turn is connected through a pipe 29 to a shutoff valve 30. The shutoff valve 30 is similar to the shutoff valve 19. The downstream side of the shutoff valve 30 is connected to a pipe 31 which in turn is connected to the delivery pipe 21.

Similarly, a hot water bypass is provided by the pipe 32 which is connected to the hot water supply line 12. This pipe 32 connects with a constant rate of flow maintaining device 33 which in turn is connected through a pipe 34 to a shutoff valve 35. Shutoff valve 35 is similar to shutoff valves 19 and 30. The downstream side of the shutoff valve 35 is connected through a pipe 36 to the final delivery pipe 21.

The above described system provides a complete unitary system for delivering water at a plurality of different selected temperatures to the tub 15. More particularly, with the shutoff valves 30 and 35 closed and the shutoff valve 19 open, fluid is delivered at the temperature determined by the automatic temperature controlled mixer valve 10 to the tub 15. With the shutoff valve 30 closed and the shutoff valves 19 and 35 open fluid is supplied to the tub 15 at a higher temperature than that delivered from the automatic temperature controlled mixer valve but since the greatest temperature variations occur from differences in variations of pressure, it will be understood that the devices 17 and 33 enable fluid to be delivered to the tub 15 at substantially a constant predetermined temperature which is higher than the predetermined temperature selected by the automatic temperature controlled mixer valve. Similarly, a somewhat cooler temperature may be obtained by opening the shutoff valves 19 and 30 and closing the shutoff valve 35. It has been found in practice that it is frequently desirable to have several temperatures available without necessitating a change of the temperature setting of the automatic temperature controlled mixer valve. Such is provided by the present system.

Figure 2:
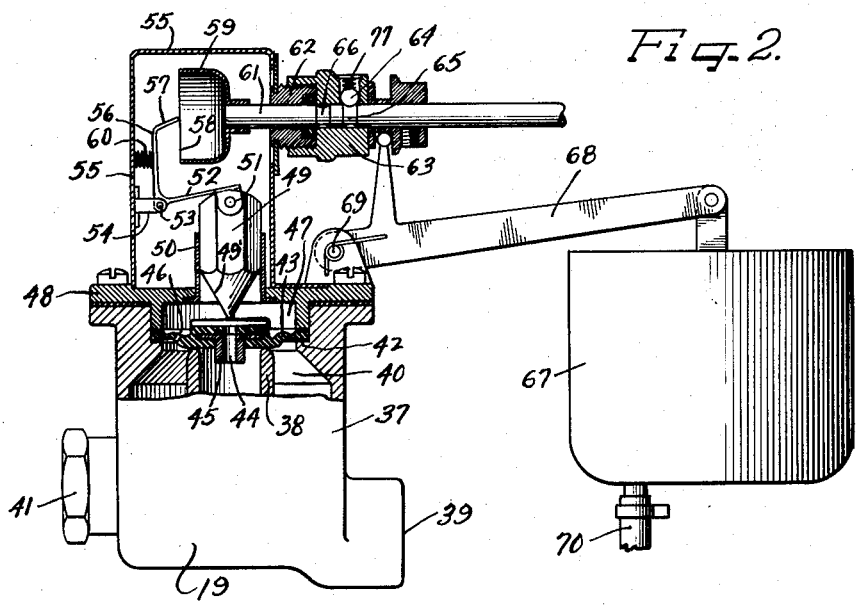
Figure 2 is an enlarged elevational view partly in section of one of the pilot operated diaphragm shutoff valves together with its associated fluid level responsive member.
Figure 3:
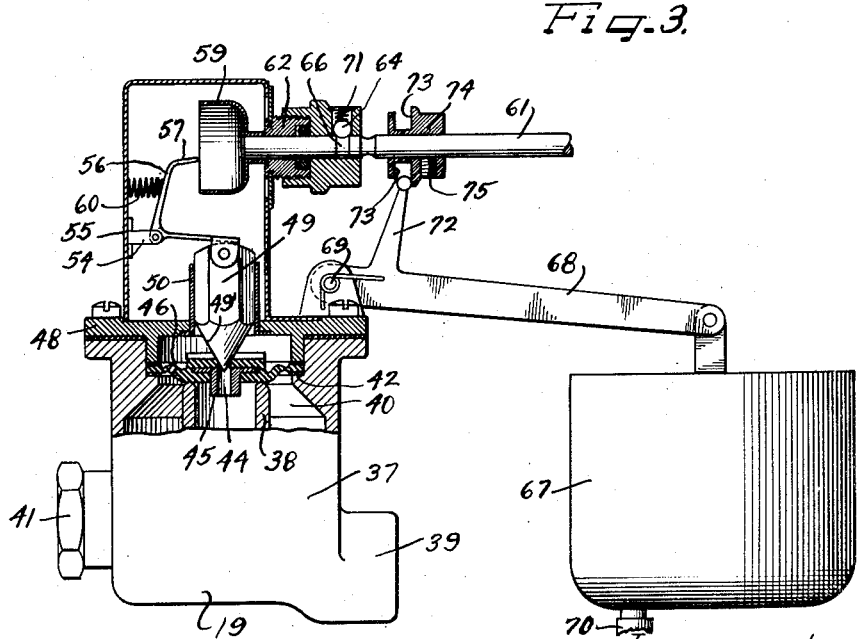
Figure 3 is a view similar to Figure 2 but showing the valve in its closed position and showing the fluid level responsive member in its lowered position.

The operating mechanism of the shutoff valve is illustrated in detail in Figures 2 and 3. Since all of the shutoff valves are the same, only one valve, namely, valve 19, is illustrated in any substantial detail.

Referring now to Figures 2 and 3, there is shown therein a pilot operated diaphragm shutoff valve having a casing or housing 37 in which is disposed a central sleeve or post 38. The sleeve or post 38 communicates directly with the outlet 39 of the casing 37, while the chamber 40 surrounding the post 38 communicates directly with the inlet 41 of the casing 37. A shoulder 42 is provided internally on the casing 37 opposite the upper end of the hollow central post 38. Upon this shoulder 42 is seated a resilient diaphragm 43 which closes the upper end of the chamber 40 and is also disposed to be seated on the upper end of the central post 38. The diaphragm 43 has a central aperture or orifice 44 therein which is reinforced by a collar member 45. The diaphragm is also provided with one or more small openings 46 which are located radially outwardly of the central post 38 and are arranged to communicate the chamber 40 with the chamber 47 on the upper side of the diaphragm 43. This chamber 47 is provided by the top plate 48.

The size of the opening 46, or, in the case of more than one opening, the total combined area of the openings 46, is less than the cross-sectional area of the opening 44. When the opening 44 is open the fluid which has previously entered the upper chamber 47 through the opening 46 will escape more rapidly through opening 44 than it can enter through opening 46. This creates a greater pressure on the under side of the diaphragm 43 than on the upper side. The fluid itself thus actuates the diaphragm to lift it off of the central post 38 and fluid thereafter flows freely from the inlet 41 to the outlet 39. When the opening 44 of the diaphragm 43 is closed fluid under pressure passes through the orifice 46 into the upper chamber 47 and exerts a pressure over substantially the entire upper surface of the diaphragm. Since this is resisted primarily by the fluid acting against the under side of the diaphragm radially outwardly of the center post 38, it is apparent that the diaphragm 43 closes upon closure of the central orifice 44.

The mechanism for effecting an opening and closing of the central opening 44 in the diaphragm 47 will now be described. A collar or sleeve 50 is mounted in an opening in the cover plate 48 of the valve casing 37. This sleeve 50 is arranged to have a pilot 49 slidably mounted therein. The pilot 49 has a tapered lower end 49' which is arranged to extend into the upper end of the opening 44 when the pilot 49 is in its lower position. The main body portion of the pilot 49 may assume any convenient configuration and as a matter of convenience has been illustrated as being hexagonal in cross-section, thereby permitting the pilot, to some extent, to be self-lubricated by the fluid in the upper chamber 47. Since the fluid in the upper chamber 47 may flow freely around the pilot 49, the sleeve 50 being circular in cross-section, a fluid-tight housing 55 is provided for the mechanism. This housing 55 is secured to the upper cover plate 48 of the valve casing 37. The pilot 49 is pivotally mounted as at 51 to a bell crank arm 52. This bell crank arm 52 is pivotally mounted as at 53 to a bracket 54 carried on the interior face of the shell or casing 55. The bell crank arm 52 includes an upstanding ledge portion 56 terminating in a lip 57 which is arranged to engage the outer marginal edge 58 of a cup-shaped actuation member 59. This cup-shaped actuation member 59 is mounted on a shaft 61 which is slidably carried in a bearing member 62. The cup-shaped form provides an annular contacting surface with the lip 57 which is effective regardless of the angular orientation of the shaft 61. A biasing spring 60 disposed between the upstanding arm portion 56 and the shell or casing 55 normally urges the lip 57 into engagement with the edge 58 of the cup-shaped member 59, thereby urging the pilot 49 downwardly toward the diaphragm 43.

The boss or bearing member 62 is arranged to receive a second cap member 63, the two being preferably threaded together as illustrated in Figure 2 of the drawings. The shaft 61 is provided with two annular recesses 65 and 66. A spring-pressed ball 64 carried in the cap 63 is normally urged by a spring 71 into engagement with either the recess portion 65 or the recess portion 66.

A collar member 74 is secured to the shaft 61 by a set screw 75. This collar is arranged to be engaged by the float actuation mechanism presently to be described.

The spring-pressed ball member 64 is arranged to normally hold the shaft 61 in one of two positions. The two positions are determined by the annular grooves 65 and 66 formed on the shaft 61. The location of the grooves 65 and 66 is such that when the groove 65 is in engagement with the ball member 64, the cup-shaped member 59 is in the position as shown in Figure 2 of the drawings. This means that the cup-shaped member 59 has engaged the finger portion 56 to raise the pilot 49 and open the valve. When the shaft 61 is in its retracted position so that the groove 66 is in engagement with the ball 64, the cup-shaped member 59 has been moved out of engagement with the finger 56, thus enabling the biasing spring 60 to return the pilot 49 to engagement with the diaphragm 43 and close the opening 44.

As seen in Figure 2 of the drawings, the pilot 49 has just been raised and fluid is being dumped from chamber 47 through opening 44. The decreased pressure on the upper surface of the diaphragm 43 will now cause the diaphragm to be lifted by the fluid pressure in the portion of the under surface of the diaphragm which lies outwardly of post 38. This action takes place almost instantaneously. The valve is closed by causing pilot 49 to close opening 44 and permit the total fluid force on the upper surface of diaphragm 43 to exceed that acting on the under side.

The particular fluid responsive means illustrated in Figures 1 to 3 of the drawings is a fluid level responsive member of the so-called weight-operated type. In this particular type of fluid level responsive means, a cup member 67 is pivotally supported on an arm 68 which is hinged as at 69 to the top plate 48 of the unit. A hose connection 70 communicates with the cup member 67 and the tub of the washing machine. Thus when the fluid in the tub has risen to a height sufficient to cause water to flow into the cup 67 the weight of the water in the cup 67 causes the arm 68 to drop down from the position as shown in Figure 2 to the position as shown in Figure 3.

The biasing spring 71 which presses the ball member 64 into engagement with the shaft 61 is of sufficient strength to prevent movement of the shaft 61 as long as the cup-shaped member 67 is empty. However, when the cup-shaped member 67 fills with water the weight overcomes the retaining action of the biasing spring 71 and causes the shaft 61 to be moved to the right. This is effected by a finger portion 72 formed on the arm 68 which extends up into a deep recess 73 in a collar member 74 which is secured to the shaft 61 by means of a set screw 75.

As may be seen best in Figure 1 of the drawings, the shaft 61 extends outwardly into engagement with the pivotally mounted actuating member 76 carried on the outer shell 16 of the washing machine. As will be clearly seen from Figure 1 of the drawings, the actuating member 76 is effective only to bring about movement of the shaft 61 in a direction from right to left, or, in other words, to effect an opening of the shutoff valve. Furthermore, it will be seen that the cup member 67 is effective to bring about a closing only of the shutoff valve, since there is nothing to cause the fluid level responsive member to return to its upper position after it has been filled with liquid and lowered to its lower position.

Due to the cooperative arrangement of the finger 72 with the collar 74, however, it will be apparent that when the actuating member 76 is moved in a clockwise direction as viewed in Figure 1 of the drawings, or depressed as viewed in Figure 4 of the drawings, the shaft 61 is moved inwardly to raise the pilot 49 and effect an opening of the shutoff valve, and at the same time the cup-shaped or fluid level responsive member 67 is raised.

From the above description it will be apparent that the actuating mechanism of the shutoff valve is such as to effect a manual opening and a fluid level responsive member or weight controlled closing thereof. All three of the shutoff valves 19, 30 and 35, are constructed in the manner as above described.

Merely as a matter of reference, the outer casing 16 of the washing machine, as shown in Figure 4, is provided with a door 77 which may be opened to afford access to the tub, thereby to enable clothing or other items to be placed in the tub or removed therefrom.

Figure 5:
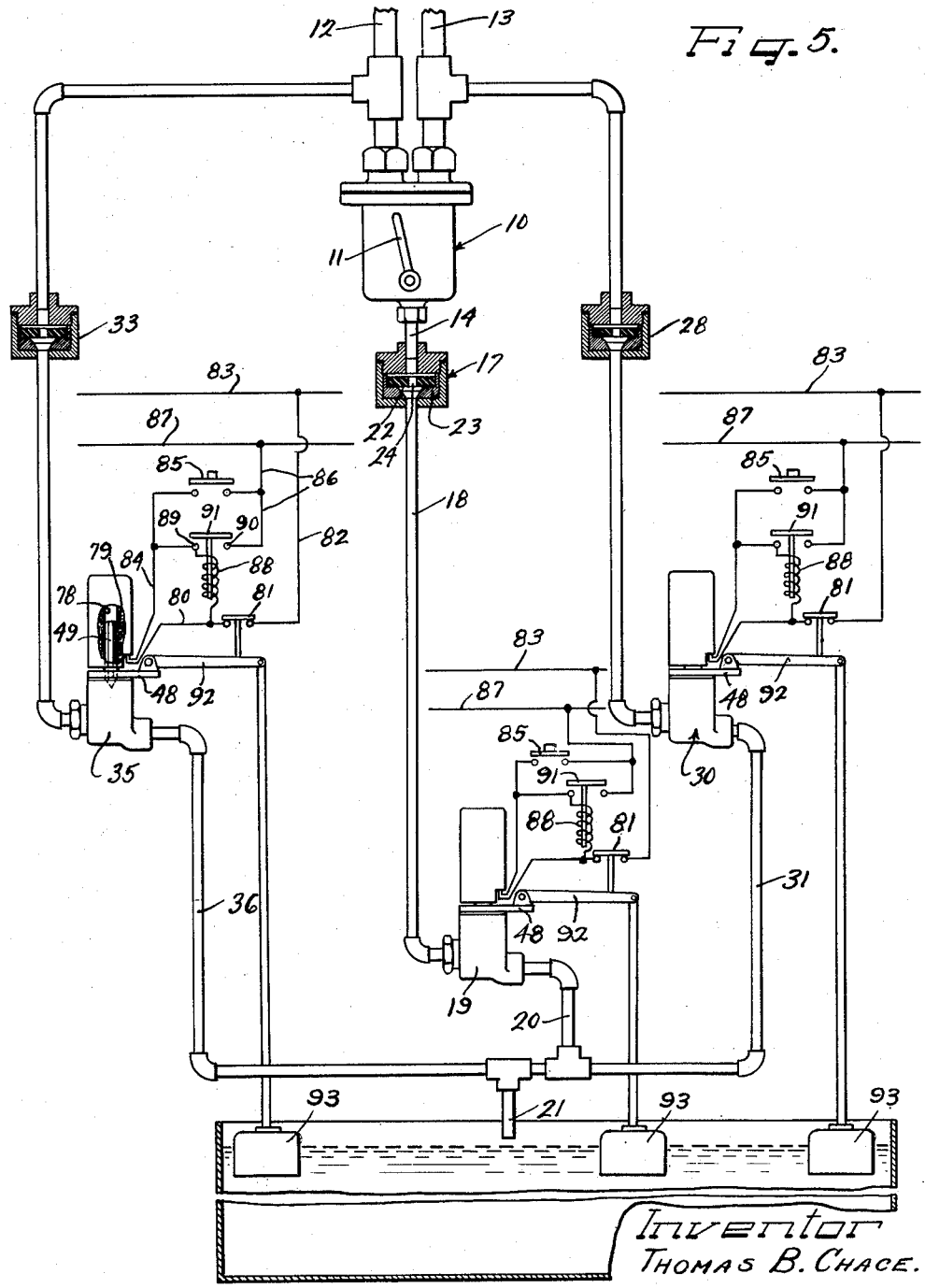
Figure 5 is a diagrammatic illustration of another embodiment of the present invention with electric push-button actuation of the flow control valves.

A modified form of the present invention is shown in Figure 5 of the drawings. The fluid portion of the system is substantially the same as that shown in Figure 1 of the drawings, and similar reference characters have been applied thereto. It differs, however, in the manner in which the pilot 49 is operated and in the type of float illustrated. More particularly, an electrical operation is provided which enables opening of the valve upon depression of a pushbutton switch, and closure of the valve only by action of the float or weight member. All three of the valves 19, 30 and 35 are equipped with the same actuating mechanism, but for purposes of simplicity, only one of these actuating mechanisms will be described. More particularly, the solenoid associated with the valve 35 has been broken away to show an inner shell 78 which surrounds the pilot 49 and is in fluid-tight relation with the top plate 48 of the valve 35 in the same manner that the top shell 55 was in Figure 2. The pilot 49 is of iron or other ferromagnetic material, and is freely mounted within the shell 78. It is so disposed that upon energization of the solenoid 79 which surrounds the shell 78, it is withdrawn up into the inner shell 78 out of engagement with the diaphragm (which is of the type illustrated in Figures 2 and 3). One side of the solenoid 79 is connected through a conductor 80, a bridging contact 81 and a conductor 82 to a power supply conductor 83. The other side of the solenoid 79 is connected through a conductor 84, a pushbutton switch 85 and a conductor 86 to the other power supply conductor 87. A relay coil 88 is connected in parallel with solenoid 79 between the conductors 80 and 84 through the stationary contact 89. A second stationary contact 90 is connected to the conductor 86 and then to the power line 87.

The relay coil 88 is arranged to move a relay bridging contact 91 into engagement with the stationary contacts 89 and 90 upon energization thereof. Bridging contact 81 previously referred to is mounted on the suspension arm 92 which carries a buoyant float or diving bell type of float 93. When the float 93 is not buoyantly supported or raised, the bridging contact 81 electrically connects conductors 80 and 82. The circuit, however, is broken when the float 67 is raised. More particularly, when the pushbutton switch 85 is closed, the relay coil 88 is energized as well as the solenoid 79. Energization of the relay coil 88 closes the bridging contact 91 which acts as a holding circuit for the coil 88. Thus, even though the pushbutton switch 85 is released (it being normally biased to an open position) the solenoid 79 remains energized from the power supply conductor 87 through the bridging contact 91 and conductor 84, and from the other power supply conductor 83 through conductor 82, bridging contact 81 and conductor 80.

Energization of the solenoid 79 lifts the pilot 49 by magnetic action and thus opens the shutoff valve 35. The shutoff valve 35 remains open until the water being introduced into the tub 15 rises to a sufficient height to raise the float 67. The raising of the float 67 opens the bridging contact 81, thus deenergizing the relay coil 88. Opening of the bridging contact 81 also effects deenergization of solenoid 79 and causes the valve to be closed. Since the bridging contact 91 is normally biased to its open position, deenergization of the relay coil 88 causes opening of the bridging contact 91 and restores it to its original position; thus, even though the tub is subsequently emptied, closing of the bridging contact 81 by dropping of the float 67 will not effect energization of the solenoid 79 until the pushbutton switch 85 is again depressed.

The pushbutton switches 85 may be conveniently mounted on the exterior of the washing machine casing in any suitable and convenient manner (not shown).

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim:

1. A washing machine fluid control system comprising relatively hot and cold fluid supply ducts, an automatic temperature control mixing valve connected to said supply ducts, a tub, a delivery duct disposed to deliver fluid to said tub, a delivery conduit connecting the discharge side of said mixing valve to said delivery duct, a second delivery duct bypassing said mixing valve and connecting said cold fluid supply duct with said delivery duct, a third delivery conduit bypassing said mixing valve and connecting said hot fluid supply duct with said delivery duct, a shutoff valve in each of said delivery conduits, manual means for selectively opening one or more of said shutoff valves a constant rate of flow maintaining device in each of said delivery conduits, and fluid level responsive means associated with said shut-off valves for shutting off all opened shut-off valves when the fluid delivered to said tub reaches a predetermined height therein.

2. A washing machine fluid control system comprising relatively hot and cold fluid supply ducts, an automatic temperature control mixing valve connected to said supply ducts, a tub, a delivery duct disposed to deliver fluid to said tub, a delivery conduit connecting the discharge side of said mixing valve to said delivery duct, a second delivery duct bypassing said mixing valve and connecting said cold fluid supply duct with said delivery duct, a third delivery conduit bypassing said mixing valve and connecting said hot fluid supply duct with said delivery duct, a shutoff valve in each delivery conduits, electrically operated means for selectively opening one or more of said shutoff valves, a constant rate of flow maintaining device in each of said delivery conduits, and fluid level responsive means associated with said shut-off valves for shutting off all opened shutoff valves when the fluid delivered to said tub reaches a predetermined height therein.

3. A washing machine fluid control system comprising relatively hot and cold fluid supply ducts, an automatic temperature control mixing valve connected to said supply ducts, a tub, a delivery duct disposed to deliver fluid to said tub, a delivery conduit connecting the discharge side of said mixing valve to said delivery duct, a second delivery duct bypassing said mixing valve and connecting said cold fluid supply duct with said delivery duct, a third delivery conduit bypassing said mixing valve and connecting said hot fluid supply duct with said delivery duct, a shutoff valve in each of said delivery conduits, pushbutton electrically operated means for selectively opening one or more of said shutoff valves, a constant rate of flow maintaining device in each of said delivery conduits, and relay means for holding said shutoff valves open until the level of the fluid delivered to said tub reaches a predetermined height, whereupon said electrical means is deenergized and all opened shutoff valves are closed.

4. A washing machine fluid control system comprising relatively hot and cold fluid supply ducts, an automatic temperature controlled mixing valve connected to said supply ducts, a tub, a delivery duct disposed to deliver fluid to said tub, a delivery conduit connecting the discharge side of said mixing valve to said delivery duct, a second delivery duct by-passing said mixing valve and connecting said cold fluid supply duct with said delivery duct, a third delivery conduit by-passing said mixing valve and connecting said hot fluid supply duct with said delivery duct, constant rate of flow maintaining means in each of said conduits, a shut-off valve in each of said delivery conduits, mechanical means for selectively opening one or more of said valves, mechanical means for holding said valves open, and mechanical means for overcoming said mechanical holding means to close said valve when the level of fluid delivered to said tub reaches a predetermined height.

5. A washing machine fluid control system comprising relatively hot and cold fluid supply ducts, an automatic temperature controlled mixing valve connected to said supply ducts, a tub, a delivery duct disposed to deliver fluid to said tub, a delivery conduit connecting the discharge side of said mixing valve to said delivery duct, a second delivery conduit by-passing said mixing valve and connecting said cold fluid supply duct with said delivery duct, a third delivery conduit by-passing said mixing valve and connecting said hot fluid supply duct with said delivery duct, constant rate of flow maintaining means in each of said conduits, a shut-off valve in each of said delivery conduits, manually operable mechanical means for selectively opening only one or more of said valves, mechanical means for holding said valves open, and mechanical means for overcoming said mechanical holding means to close said valve when the level of fluid delivered to said tub reaches a predetermined height.

THOMAS B. CHACE.

REFERENCES CITED

The following references are of record in the file of this patent:

UNITED STATES PATENTS

| Number | Name | Date |
| --- | --- | --- |
| 390,960 | Gustin | Oct. 9, 1888 |
| 631,741 | Friedrich | Aug. 22, 1899 |
| 775,021 | Waterman | Nov. 15, 1904 |
| 2,188,366 | Linstaedt | Jan. 30, 1940 |
| 2,269,259 | Fields | Jan. 6, 1942 |
| 2,296,266 | Breckenridge | Sept. 22, 1942 |
| 2,321,573 | Chace | June 15, 1943 |
| 2,381,146 | Wangenheim | Aug. 7, 1945 |

FOREIGN PATENTS

| Number | Country | Date |
| --- | --- | --- |
| 824,881 | France | Nov. 18, 1937 |